United States Patent
Weber et al.

(10) Patent No.: US 8,552,111 B2
(45) Date of Patent: Oct. 8, 2013

(54) ENVIRONMENTALLY FRIENDLY POLYMERIC TEXTILE COATING

(75) Inventors: Robert F. Weber, Acworth, GA (US); Michael Zagryn, Douglasville, GA (US)

(73) Assignee: Kittrich Corporation, La Mirada, CA (US)

( * ) Notice: Subject to any disclaimer, the term of this patent is extended or adjusted under 35 U.S.C. 154(b) by 832 days.

(21) Appl. No.: 12/013,136

(22) Filed: Jan. 11, 2008

(65) Prior Publication Data

US 2008/0171482 A1    Jul. 17, 2008

Related U.S. Application Data

(60) Provisional application No. 60/884,798, filed on Jan. 12, 2007.

(51) Int. Cl.

| | |
|---|---|
| *C08G 63/91* | (2006.01) |
| *C08G 63/48* | (2006.01) |
| *C04B 38/08* | (2006.01) |
| *C04B 38/10* | (2006.01) |
| *B32B 27/30* | (2006.01) |
| *B32B 5/20* | (2006.01) |

(52) U.S. Cl.
USPC .............. 525/54.2; 106/605; 442/74; 442/77; 442/123

(58) Field of Classification Search
USPC .............. 442/396, 59–180; 524/47, 300, 366, 524/569; 521/56, 95
See application file for complete search history.

(56) References Cited

U.S. PATENT DOCUMENTS

| | | | |
|---|---|---|---|
| 3,770,670 A | 11/1973 | Kuhlow et al. | |
| 3,949,145 A | 4/1976 | Otey et al. | |
| 4,423,110 A * | 12/1983 | Sato | 428/304.4 |
| 4,599,264 A * | 7/1986 | Kauffman et al. | 442/375 |
| 5,268,222 A | 12/1993 | Honeycutt | |
| 5,321,064 A * | 6/1994 | Vaidya et al. | 524/56 |
| 5,393,801 A | 2/1995 | Nakamura et al. | |
| 5,475,080 A | 12/1995 | Gruber et al. | |
| 5,541,275 A | 7/1996 | Fleischmann et al. | |
| 5,629,364 A | 5/1997 | Malmbom et al. | |

(Continued)

OTHER PUBLICATIONS

International Search Report for International application No. PCT/US08/50916 dated May 16, 2008.

(Continued)

Primary Examiner — Jennifer A Steele

(74) Attorney, Agent, or Firm — Lewis Kohn & Fitzwilliam LLP

(57) ABSTRACT

A composition comprises a polyvinylchloride homopolymer, a biodegradable plasticizer and either a swelling agent or a carbohydrate coupled to the polyvinylchloride homopolymer or a combination thereof. The composition may further comprise a blowing agent. A coated fabric comprises a textile substrate and a biodegradable coating at least partially coating the textile substrate, wherein the biodegradable coating degrades at least 60% after 28 days under the ASTM D584 standard. A method of making a biodegradable coating comprises providing a polymer and blending a biodegradable plasticizer with the polymer to form a blend. A method of making a coated textile comprises providing a textile and a composition comprising a polymer, a biodegradable plasticizer, and at least one other component; applying the composition to the textile; and curing the composition, thereby making a coated textile.

2 Claims, 3 Drawing Sheets

(56) References Cited

U.S. PATENT DOCUMENTS

| | | |
|---|---|---|
| 5,663,216 A | 9/1997 | Tomka |
| 5,665,474 A | 9/1997 | Gruber et al. |
| 5,786,408 A | 7/1998 | Kuroda et al. |
| 5,830,937 A | 11/1998 | Shalov et al. |
| 5,844,023 A | 12/1998 | Tomka |
| 5,852,166 A | 12/1998 | Gruber et al. |
| 5,861,216 A | 1/1999 | Doane et al. |
| 6,025,417 A | 2/2000 | Willett et al. |
| 6,040,063 A | 3/2000 | Doane et al. |
| 6,096,809 A | 8/2000 | Lorcks et al. |
| 6,117,925 A | 9/2000 | Tomka |
| 6,124,401 A | 9/2000 | Hart, Jr. et al. |
| 6,143,863 A | 11/2000 | Gruber et al. |
| 6,214,907 B1 | 4/2001 | Tomka |
| 6,235,815 B1 | 5/2001 | Loercks et al. |
| 6,455,148 B1 | 9/2002 | Spears et al. |
| 6,709,763 B2 | 3/2004 | Fanta et al. |
| 6,869,985 B2 | 3/2005 | Mohanty et al. |
| 6,903,053 B2 | 6/2005 | Noda et al. |
| 7,052,776 B2 | 5/2006 | Fanta et al. |
| 7,077,994 B2 | 7/2006 | Bond et al. |
| 7,094,817 B2 | 8/2006 | Halley et al. |
| 7,256,250 B2 | 8/2007 | Tuominen et al. |
| 7,354,656 B2 | 4/2008 | Mohanty et al. |
| 7,390,841 B2 | 6/2008 | Grossman |
| 2002/0028857 A1 | 3/2002 | Holy |
| 2002/0088396 A1* | 7/2002 | Caldwell et al. ............... 118/663 |
| 2003/0113564 A1 | 6/2003 | Noda et al. |
| 2003/0220036 A1 | 11/2003 | Lee et al. |
| 2005/0031882 A1 | 2/2005 | Noda et al. |
| 2005/0136259 A1* | 6/2005 | Mohanty et al. ............... 428/409 |
| 2005/0255142 A1* | 11/2005 | Chudzik et al. ............... 424/426 |
| 2006/0141234 A1 | 6/2006 | Rearick et al. |
| 2006/0167132 A1* | 7/2006 | Grossman ..................... 523/124 |
| 2006/0246307 A1 | 11/2006 | Chang |

OTHER PUBLICATIONS

Written Opinion for International application No. PCT/US08/50916 dated May 16, 2008.

* cited by examiner

ENVIRONMENTALLY FRIENDLY POLYMERIC TEXTILE COATING

CROSS-REFERENCE TO RELATED APPLICATIONS

The present application is based on and claims priority to U.S. Provisional Patent Application Ser. No. 60/884,798 filed Jan. 12, 2007 and entitled "Environmentally Friendly Polymeric Textile Coating", hereby incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Plastic materials are generally made of two types of components. The main type of component is the polymer, or resin, which makes up the bulk of the plastic composition. The second type of component is additives. Although additives are a small part of the overall plastic composition, they give plastics useful properties. To a large extent, additives are the components that allow for the great variety of plastics available on the market. One class of plastics additives is plasticizers, which give plastics flexibility and durability. Some plasticizers are used in the composition for polyvinyl chloride (PVC), for example, a polymer used in diverse applications such as coatings, plumbing, construction materials and plastic bottles.

Polymers are used in a variety of plastic articles including films, sheets, fibers, foams, molded articles, adhesives and many other specialty products. In one application, polymers or plastics are used to coat textiles to impart protective and other properties to textiles. For example, it may be desirable to prevent one surface from sliding across another surface, and polymeric non-slip coatings may be used in such applications. For example, liners or underlays may be used to prevent rugs and carpets from sliding across wood and tile flooring. In another application, a non-slip textile product may be used to keep a piece of clothing in place during wear. Polymeric or plastic coatings may also render textiles waterproof or fireproof among other useful properties.

SUMMARY

In one aspect, the present disclosure is directed to a composition comprising a polyvinylchloride homopolymer, a biodegradable plasticizer and a swelling agent, such as starch, for example. In various embodiments, the biodegradable plasticizer may comprise a polyhydric alcohol, an acetal, a butyrate, a laureate, fatty acids, oils, oleates, or combinations thereof. The composition may further comprise a blowing agent. In various embodiments, the blowing agent comprises azodicarbonamide, hollow microspheres, or combinations thereof. The composition may further comprise a carbohydrate coupled to the polyvinylchloride homopolymer. In various embodiments, the carbohydrate comprises a monosaccharide, a disaccharide, a polysaccharide, sucrose, fructose, galactose, lactose, or combinations thereof.

In another embodiment, a composition comprises a polyvinylchloride homopolymer, a biodegradable plasticizer and a carbohydrate coupled to the homopolymer. In various embodiments, the biodegradable plasticizer may comprise a polyhydric alcohol, an acetal, a butyrate, a laureate, fatty acids, oils, oleates, or combinations thereof. In various embodiments, the carbohydrate may comprise a monosaccharide, a disaccharide, a polysaccharide, sucrose, fructose, galactose, lactose, or combinations thereof. The composition may further comprise a blowing agent. In various embodiments, the blowing agent comprises azodicarbonamide, hollow microspheres, or combinations thereof. The composition may further comprise a swelling agent, such as starch, for example.

In another aspect, the present disclosure is directed to a coated fabric comprising a textile substrate and a biodegradable coating at least partially coating the textile substrate; wherein the biodegradable coating degrades at least about 60% after 28 days under the ASTM D584 standard. In an embodiment, the biodegradable coating comprises a porous network that may have an open cell framework or a closed cell framework. The biodegradable coating may comprise a polymer, a biodegradable plasticizer, and at least one other component. In an embodiment, the polymer comprises a polyvinylchloride homopolymer. In various embodiments, the biodegradable plasticizer may comprise a polyhydric alcohol, an acetal, a butyrate, a laureate, fatty acids, oils, oleates, or combinations thereof. In various embodiments, the at least one other component comprises a swelling agent, a blowing agent, a carbohydrate coupled to the polymer, or combinations thereof. The swelling agent may comprise starch. The blowing agent may comprise azodicarbonamide, hollow microspheres, expandable microspheres, or combinations thereof The carbohydrate coupled to the polymer may comprise a monosaccharide, a disaccharide, a polysaccharide, sucrose, fructose, galactose, lactose, or combinations thereof.

In yet another aspect, the present disclosure is directed to a method of making a biodegradable coating comprising providing a polymer and blending a biodegradable plasticizer with the polymer to form a blend. In an embodiment, the polymer comprises a polyvinylchloride homopolymer. In various embodiments, the method may further comprise adding a swelling agent to the blend, coupling a carbohydrate to the polymer, adding a blowing agent to the blend, mechanically frothing the biodegradable coating, adding hollow microspheres, adding expandable microspheres, or combinations thereof.

In still another aspect, the present disclosure is directed to a method of making a coated textile comprising providing a textile and a composition comprising a polymer, a biodegradable plasticizer, and at least one other component; applying the composition to the textile; and curing the composition, thereby making a coated textile. In various embodiments, the at least one other component comprises a swelling agent, a blowing agent, a carbohydrate coupled to the polymer, or combinations thereof.

Thus, the embodiments of the compositions, coated fabrics and methods disclosed herein comprise a variety of features and properties. The various characteristics described above, as well as other features, will be readily apparent to those skilled in the art upon reading the following detailed description and by referring to the accompanying drawings.

BRIEF DESCRIPTION OF THE DRAWINGS

For a more complete understanding of the present disclosure, and for further details thereof, reference is now made to the accompanying drawings, in which.

DETAILED DESCRIPTION

The majority of plastic or polymer coatings that include a plasticizer are non-degradable and end up in the solid waste stream. While some efforts at recycling have been made, repeated processing of even pure polymers results in degradation of material and consequently poor mechanical properties. Different grades of chemically similar plastics mixed upon collection can cause processing problems that make the reclaimed material inferior or unusable. Furthermore, consumers prefer products that are more environmentally friendly and biodegradable.

The present disclosure relates generally to textile coatings, and more particularly to various embodiments of biodegradable polymer textile coatings. In particular, disclosed herein are embodiments of a biodegradable (e.g. environmentally friendly) composition, methods of making the biodegradable composition, a textile product comprising the biodegradable composition, and a method for applying the biodegradable composition to the textile product. The biodegradable composition is susceptible to biodegradation and, thus, is easily disposed of with minimal environmental impact.

Figure 1:
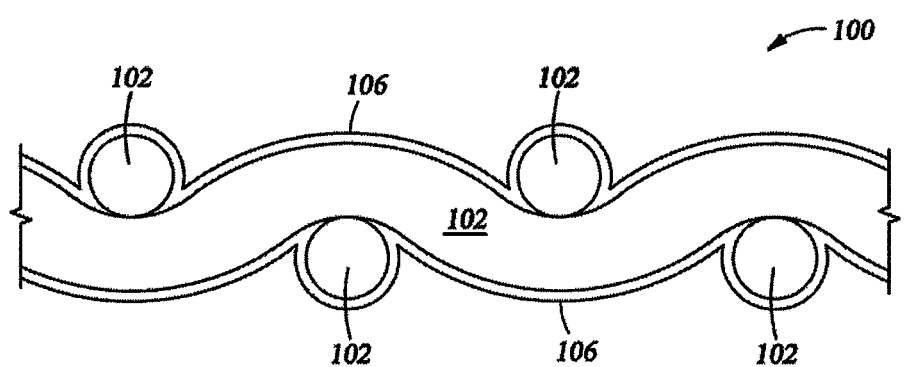
FIG. 1 depicts a cross-sectional side view of one embodiment of a textile product coated with a biodegradable composition.

FIG. 1 depicts a cross-sectional side view of one embodiment of a biodegradable textile product 100 comprising a textile substrate 102 at least partially coated with a biodegradable composition 106. The textile substrate 102 contains a plurality of fibers oriented in a plurality of directions and may be in the form of a woven fabric or a nonwoven fiber batt. The textile substrate 102 may contain natural fibers, such as cotton, wool, or silk; synthetic fibers, such as rayon, nylon, polyester, polypropylene, or other polymeric fibers; non-porous synthetic fibers, such as glass, polyamide, and/or asbestos fibers; or a blend of any of the aforementioned fibers. For example, the textile substrate 102 may comprise a woven or knitted fabric comprising a blend of cotton and polyester fibers. If the textile substrate 102 contains porous fibers, then the biodegradable composition 106 may be at least partially absorbed into the fibers. Alternatively, if the textile substrate 102 contains non-porous fibers, then the biodegradable composition 106 may be at least partially adhered or adsorbed onto the surface of the fibers. The specific formulation for the biodegradable composition 106 may be modified depending upon the characteristics of the fibers in the textile substrate 102.

In general, the biodegradable composition 106 has a formulation comprising a polymer and one or more biodegradable plasticizers. In an embodiment, the polymer comprises a polyvinylchloride homopolymer. As defined herein, a homopolymer is a polymer made from one type of monomer. The polymer may be any suitable homopolymer, such as without limitation, polypropylene, polyethylene, polystyrene, polyurethane, polyester, silicone, etc. In other embodiments, the polymer comprises a biodegradable polymer including without limitation, polycaprolactone, poly(lactic acid), poly(glycolic acid), or combinations thereof. In an alternative embodiment, the polymer is a copolymer. As used herein, "biodegradable" refers to the ability of a compound to ultimately be degraded completely into $CH_4$, $CO_2$, and water or biomass by microorganisms and/or natural environmental factors and also by other chemical mechanisms such as hydrolysis.

As used herein, "compostable" refers to a material that meets the following three requirements: (1) the material is capable of being processed in a composting facility for solid waste; (2) if so processed, the material will end up in the final compost; and (3) if the compost is used in the soil, the material will ultimately biodegrade in the soil.

In various embodiments, the biodegradable composition 106 contains polymer in an amount between about 1 percent and about 99 percent, between about 10 percent and about 90 percent, or between about 30 percent and about 70 percent. The percentages described herein may be on a dry or wet weight basis.

In an embodiment, the biodegradable composition 106 comprises one or more biodegradable plasticizers. As defined herein, a plasticizer is any additive or compound that softens a material. Plasticizers may also improve the ability of the biodegradable composition 106 to retain gas bubbles and/or a desired density in forming a porous network. A biodegradable plasticizer is any plasticizer that may be broken down by microorganisms or by other mechanisms such as hydrolysis or oxidative degradation. Examples of suitable biodegradable plasticizers include without limitation, a polyhydric alcohol, an acetal, a butyrate, a laureate, a fatty acid, an oil, an oleate, an ester, a protein, or combinations thereof. However, any biodegradable plasticizer may be added to the biodegradable composition 106. In general, the biodegradable composition 106 may comprise one or more biodegradable plasticizers at a concentration of between about 0.1 percent and about 70 percent by weight, between about 1 percent and about 60 percent by weight, or between about 5 percent and about 50 percent by weight.

According to one embodiment, the biodegradable composition 106 may additionally comprise a non-biodegradable plasticizer. Any non-biodegradable plasticizer known to those of skill in the art may be incorporated into the biodegradable composition 106. Examples of suitable plasticizers include without limitation, a phthalate plasticizer, an adipate plasticizer, a maleate, a sebecate, an organophosphate, a benzoate, sulfonamide, a glycol, a polyether, a polymeric plasticizer, or combinations thereof. In embodiments, biodegradable composition 106 comprises one or more non-biodegradable plasticizers between about 0 percent and about 40 percent by weight, between about 10 percent and about 35 percent by weight, or between about 15 percent and about 30 percent by weight.

In a further embodiment, the biodegradable composition 106 comprises a swelling agent. Without being limited by theory, it is believed that the incorporation of a swelling agent may dissociate the polymer chains and increase the intermolecular spacing to provide greater exposure of the polymer chains to microorganisms and/or degradative processes. For example, the swelling agent may comprise a biodegradable swelling agent, such as starch. Again, without being bound by theory, it is believed that the starch chain will uncoil and spread out, pushing the polymer chain apart, thereby exposing the polymer chain to microorganisms or other degradative processes. Other examples of suitable swelling agents that may be used with the biodegradable composition 106 include without limitation, hydrogels, sorbents, polymers, microparticles, nanoparticles, or combinations thereof. In embodiments, the biodegradable composition 106 may comprise one or more swelling agents at a concentration between about 0.1 percent and about 20 percent by weight, between about 1 percent and about 15 percent by weight, or between about 5 percent and about 10 percent by weight.

In another embodiment, biodegradable composition 106 comprises one or more carbohydrates coupled to the polymer. Typically, the one or more carbohydrates are covalently attached to the polymer backbone. However, the one or more carbohydrates may be coupled by other mechanisms such as hydrogen bonding, ionic interactions, etc. In one embodiment, the one or more carbohydrates comprises a sugar such as fructose, glucose, sucrose, galactose, or combinations thereof. Other examples of carbohydrates include without limitation, monosaccharides, disaccharides, polysaccharides, lactose, glycogen, cellulose, maltose, or combinations thereof.

Without being limited by theory, it is believed that the carbohydrate may enhance the biodegradability of the biodegradable composition 106 by making the polymer component more attractive to biological processes and microorganisms. For example, the carbohydrate may improve the digestibility of synthetic polymer molecules by fungus or bacteria. In embodiments utilizing polyvinylchloride homopolymers, the one or more carbohydrates work in conjunction with the polar C—Cl bonds to further increase digestibility by microorganisms. The biodegradable composition 106 may comprise a carbohydrate at a concentration between about 0.1 percent and about 20 percent by weight, between about 1 percent and about 15 percent by weight, or between about 5 percent and about 10 percent by weight.

In other embodiments, the biodegradable composition 106 further comprises other components including a blowing agent, a viscosity control fluid, a catalyst, a filler, colorants, other suitable additives, or combinations thereof. In one embodiment, the biodegradable composition 106 formulation comprises a blowing agent. A blowing agent, as defined herein, is any chemical compound or other agent that produces a gas, such as carbon dioxide, nitrogen, or oxygen, within the biodegradable composition 106. The blowing agent may be a chemical blowing agent that reacts with other components within the formulation to produce the gas. An example of a blowing agent includes without limitation, azodicarbonamide. Alternatively, the blowing agent may be activated by heat, infrared radiation, ultraviolet radiation, radio frequency, and/or time.

The blowing agent may comprise an expandable microsphere, a non-expandable microsphere, a hollow microsphere, a nanoshell, a nanoparticle, or combinations thereof. According to one embodiment, the blowing agent comprises expandable microspheres. In a particular embodiment, the blowing agent is a liquefied hydrocarbon blowing agent encapsulated within a thermoplastic resin shell. When heated, the thermoplastic shell softens and/or decomposes to release the liquefied hydrocarbon blowing agent. A sufficiently small residual amount of thermoplastic shell material would remain in the biodegradable composition 106 so as not to affect the properties of the biodegradable composition 106. Larger amounts of the expandable microspheres may cause the biodegradable composition 106 to foam.

The blowing agent imparts porosity to the biodegradable composition 106. In other words, the blowing agent causes the formation of biodegradable compositions having a cellular network. Such embodiments of the biodegradable composition 106 may have an open cell or interconnected pore structure. Alternatively, the biodegradable composition 106 may comprise a closed cell pore structure or framework. Without being limited by theory, it is believed that the porosity increases the permeability of the biodegradable composition 106 to liquids such as water, which in turn increases the susceptibility of the biodegradable composition 106 to biodegradation. In various embodiments, the biodegradable composition 106 contains between about 1 percent and about 20 percent by weight, between about 3 percent and about 10 percent by weight, or between about 5 percent and about 8 percent by weight of the blowing agent for foamed applications.

The biodegradable composition 106 formulation may optionally comprise a filler. The filler may increase the volume of the biodegradable composition 106 without substantially reducing the non-slip property of the textile product 100. Calcium carbonate is one example of a suitable filler that is relatively inexpensive and does not alter the non-slip properties of the biodegradable composition 106. In various embodiments, the biodegradable composition 106 contains the filler in an amount between about 0 percent and about 99 percent by weight, between about 10 percent and about 85 percent by weight, or between about 20 percent and about 50 percent by weight.

The biodegradable composition 106 formulation may optionally comprise one or more additives. For example, the formulation may comprise a colorant, dye, or pigment, so as to meet the aesthetic demands of the consumer. The colorant may be any color, including black, white, gray, brown, red, orange, yellow, green, blue, violet, or combinations thereof. Other suitable additives include: resins, odor absorbing agents, processing aids, antioxidants, and surfactants.

The biodegradable composition 106 may optionally comprise a catalyst. The catalyst may be added to the formulation to control the rates of polymerization and any other reactions occurring within the biodegradable composition 106. Platinum and platinum-containing compounds are examples of suitable catalysts. Specific examples of catalysts suitable for use with the biodegradable composition 106 include: Silastic 9050-50P-B available from Dow Corning and Cat 1300 available from Shin Etsu. In various embodiments, the biodegradable composition 106 contains the catalyst in an amount between about 0.01 percent and about 25 percent by weight, between about 0.1 percent and about 15 percent by weight, or between about 1 percent and about 10 percent by weight.

The amount of biodegradable composition 106 coated onto the textile substrate 102 will vary depending on the desired application. In applications where a high degree of non-slip property is sought, such as shelf liners, a greater amount of biodegradable composition 106 may be applied onto the textile substrate 102. In applications where a lesser degree of non-slip property is required, a lesser amount of biodegradable composition 106 may be applied onto the textile substrate 102. In various embodiments, the thickness of the biodegradable composition 106 on the textile substrate 102 ranges from about 1 thousandth of an inch (mil) to about 350 mils, from about 10 mils to about 200 mils, or from about 20 mils to about 100 mils.

The biodegradable compositions 106 described herein may be tested under any suitable standard. In one embodiment, the biodegradable compositions 106 are tested under ASTM standard D5864 (Modified Sturm Test), hereby incorporated by reference herein, which is the "Standard Test Method for Determining Aerobic Aquatic Biodegradation of Lubricants or Their Components." The "Modified Sturm Test" uses carbon dioxide production as the primary end point in assessing the biodegradation potential of organic chemicals.

The standard covers the determination of the degree of aerobic aquatic biodegradation of fully formulated lubricants or their components on exposure to a bacterial inoculum under laboratory conditions. The test method is intended to specifically address the difficulties associated with testing water insoluble materials and complex mixtures as are found in many lubricants. The ASTM method is also applicable to all lubricants that are not volatile and are not inhibitory at the test concentration to the organisms present in the inoculum. A substance known to be biodegradable is tested simultaneously with the test substance. For water soluble test substances, suggested reference substances are sodium benzoate or aniline. For water insoluble test substances, the suggested reference substance is low erucic acid rapeseed oil, also called LEAR, such as canola oil. The test continues for at least 28 days or until the carbon dioxide evolution has reached a plateau. Under ASTM D5864, a material is labeled "biodegradable" if it degrades more than about 60% within 28 days. A material is labeled "readily biodegradable" if it degrades more than about 60% within 10 days. Thus, in an embodiment, a coated fabric comprises a biodegradable composition 106 which degrades at least about 60% within 28 days under the ASTM D5864 standard.

As previously mentioned, the biodegradable composition 106 may impart a non-slip property onto the textile substrate 102. The non-slip property may be defined as the ability of the biodegradable composition 106 to resist sliding across another surface. The non-slip property may be quantified by the coefficient of friction of the biodegradable composition 106. Thus, to impart a non-slip property onto the textile substrate 102, the coefficient of friction of the biodegradable composition 106 may be higher than the coefficient of friction of the textile substrate 102. In specific embodiments, the coefficient of friction of the biodegradable composition 106 on various types of flooring or other surfaces may be at least about 0.7, at least about 1, or at least about 2.

In an embodiment, a method for making a biodegradable composition 106 comprises providing a polymer. The polymer may be a homopolymer. In a particular embodiment, the polymer is a polyvinylchloride homopolymer. Furthermore, the method may comprise adding or blending a biodegradable plasticizer with the polymer to form a blend. In an additional embodiment, a swelling agent is added to the blend. Moreover, as described above, other components may optionally be added to the polymer and biodegradable plasticizer such as without limitation, blowing agents, fillers, pigments, etc.

In another embodiment, the method comprises coupling one or more carbohydrates to the polymer. Any suitable carbohydrate, as explained above, may be coupled to the polymer. Additionally, any chemical methods and reactions known to those of skill in the art to couple carbohydrates to polymers may be used to couple the one or more carbohydrates to the polymer.

In an embodiment, a gas may be incorporated into the biodegradable composition to make the biodegradable composition 106 porous. While blowing agents may be used to create gas within the biodegradable composition 106, other methods may also be used to incorporate pores into the biodegradable composition 106. For example, liquid resin may be whipped or mechanically frothed to incorporate air or any other gas into the biodegradable composition 106 until the biodegradable composition 106 achieves a desired density or porosity. In such an embodiment, the plasticizer included in the biodegradable composition 106 maintains the desired density for an extended period of time.

Figure 2:
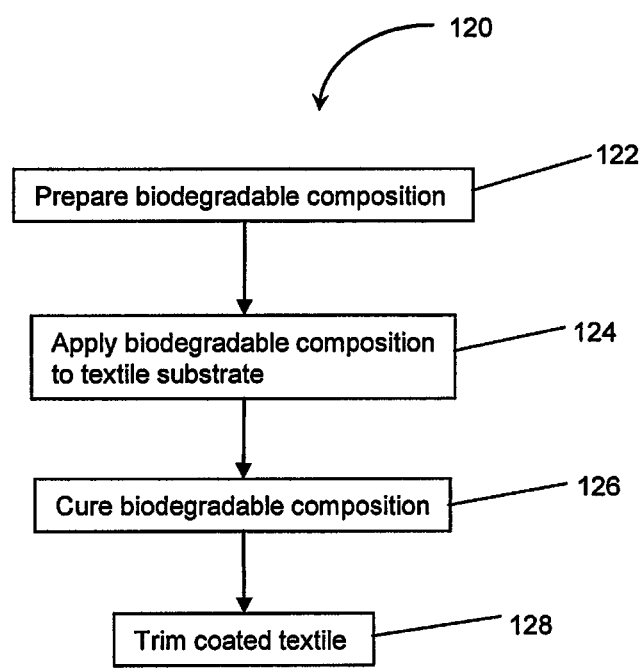
FIG. 2 is a flow chart of one embodiment of a process for applying a biodegradable composition to a textile substrate.

A method for manufacturing a textile product 100 will now be described in further detail. As represented by the flow chart of FIG. 2, a method 120 for manufacturing the textile product 100 generally comprises: preparing the biodegradable composition at 122, applying the biodegradable composition to the textile substrate at 124, curing the biodegradable composition, thereby forming the textile product at 126, and trimming the textile product at 128. Each block 122, 124, 126, 128 of method 120 is described in further detail below.

At 122 of the method 120, the biodegradable composition 106 is prepared according to the method of making a biodegradable composition 106 as described above.

At 124 of method 120, the biodegradable composition is applied to the textile substrate in one of various different ways. In one embodiment, the biodegradable composition is applied to the textile substrate using a roller coating process. The roller coating process, also called a "kiss coating" process, stretches the textile substrate between a series of tenters that convey the textile substrate through the roller coating process. The liquid biodegradable composition is located in a trough, vat, or tray below the textile substrate. A rotating roller is positioned between the textile substrate and the trough such that the upper portion of the roller contacts the textile substrate and travels in the same direction as the textile substrate while the lower portion of the roller becomes submerged in the biodegradable composition. The biodegradable composition clings to the surface of the roller as it rotates upward and is applied onto the textile substrate when the roller contacts the textile substrate. If desired, two doctor blades may be positioned above and below the coated textile substrate at a predetermined distance so as to meter the amount of biodegradable composition applied to the textile substrate by scraping off excess biodegradable composition.

In another embodiment, the biodegradable composition may be applied to the textile substrate using a dip and scrape process. The dip and scrape process, also called a "dip saturation" process, uses rollers to route the textile substrate into an immersion trough containing the liquid biodegradable composition. When the textile substrate emerges from the immersion trough, two doctor blades positioned on either side of the coated textile substrate at a predetermined distance meter the amount of biodegradable composition applied to the textile substrate by scraping off excess biodegradable composition.

At 126 of method 120, the biodegradable composition is cured in one of various different ways. In one embodiment, the biodegradable composition is cured by passing the coated textile substrate though an oven. Alternatively, the biodegradable composition can be cured using infrared or ultraviolet lamps. The biodegradable composition can also be cured using radio frequency or it can self-cure over time. The temperature and time required to cure the biodegradable composition will vary depending on the specific formulation of the biodegradable composition, the type, denier, and weave of the fibers in the textile substrate, and the amount of biodegradable composition coated onto the textile substrate. However, in various embodiments, the oven may be configured to have a temperature range between about 150° F. and about 600° F., between about 300° F. and about 450° F., or between about 360° F. and about 390° F. If infrared lamps are used to cure the biodegradable composition, in various embodiments the lamps have an intensity between about 0.5 and about 200 watts per square inch, between about 5 and about 50 watts per square inch, or between about 10 and about 20 watts per square inch. In various embodiments, the time required to cure the biodegradable composition coated on the textile substrate is between about 2 seconds and about 30 minutes, between about 30 seconds and about 15 minutes, or between about 1 minute and about 5 minutes. Once the biodegradable composition has been cured, the coated textile substrate is referred to as a textile product 100.

At 128 of method 120, the textile product 100 may be trimmed to a desired size. In an embodiment, the trimming process generally comprises cutting the textile product 100 with a knife or other cutting instrument. The textile product 100 is generally cut widthwise into standardized lengths, such as about 100 feet, about 300 feet, or about 1,000 feet. In some embodiments, it is also preferable to trim the edges of the textile product 100 because the edges may contain uncoated substrate material, may contain frayed material, or may otherwise be undesirable. Furthermore, in some embodiments, it is also desirable to trim the textile product 100 lengthwise into standardized widths, such as about 1 foot, about 3 feet, or about 5 feet. The textile product 100 is then generally folded or rolled such that it is suitable for packaging and/or transportation.

Figure 3:
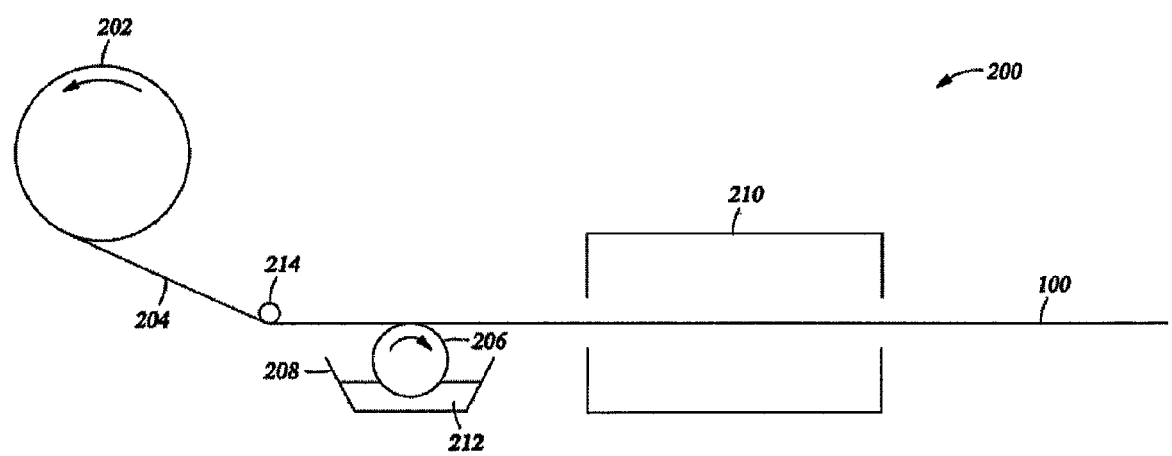
FIG. 3 is a schematic representation of one embodiment of a processing line for applying a biodegradable composition to a textile substrate.

FIG. 3 is a schematic side view of one representative embodiment of a processing line 200 for implementing the manufacturing process described herein. The processing line 200 comprises a wound roll 202 of textile substrate 204, a roller 206, a trough 208, an oven 210, a guide roll 214, and the biodegradable composition 212. The textile substrate 204 is unwound from the roll 202 and aligned with the oven 210 using one or more guide rolls 214. The processing line 200 uses the roller coating process described above to apply the biodegradable composition 212 onto the textile substrate 204. The tenters are not shown in FIG. 3 to better illustrate the process. As described above, the roller coating process uses the roller 206 to pick up some of the biodegradable composition 212 from the trough 208 and coat the textile substrate 204 with the biodegradable composition 212. The coated textile substrate 204 then passes through the oven to cure, thereby producing the textile product 100. The textile product 100 may be used in a variety of applications, including bedding, clothing, underlayment for flooring, carpet or rugs, shelf liner, and the like.

EXAMPLES

To further illustrate various illustrative embodiments of the present invention, the following examples are provided.

EXAMPLE 1

| | | |
|---|---|---|
| 30 to 60 | parts by weight (pbw) | PRIMARY PLASTICIZER |
| 1 to 40 | pbw | SECONDARY PLASTICIZER (A) |
| 0 to 40 | pbw | SECONDARY PLASTICIZER (B) |
| 0 to 40 | pbw | SECONDARY PLASTICIZER (C) |
| 0 to 40 | pbw | SECONDARY PLASTICIZER (D) |
| 1 to 20 | pbw | EXPANDABLE MICROSPHERES |
| 1 to 20 | pbw | SUGAR INOCULUM |
| 1 to 20 | pbw | STARCH INOCULUM |
| 0 to 10 | pbw | CHEMICAL BLOWING AGENT (CBA) |
| 1 to 5 | pbw | CBA ACTIVATOR/STABILIZER |
| 100 | pbw | PVC RESIN |
| 0 to 150 | pbw | FILLER (A) |
| 0 to 150 | pbw | FILLER (B) |
| | (as needed) | PIGMENT |

In this example, the numbers represent parts by weight per 100 parts PVC resin. At least one of the primary plasticizer and the secondary plasticizer(s) is a biodegradable plasticizer. Bench testing was conducted where the dip and scrape manufacturing method discussed herein was simulated by dipping a knit polyester scrim into the biodegradable composition, scraping the excess biodegradable composition off the coated scrim, and then curing the coated scrim in an oven at 200 degrees Celsius for 2 minutes. The biodegradable composition coated onto the textile substrate produced an acceptable coated textile product.

EXAMPLE 2

| | |
|---|---|
| 44.4 wt % | Eastman's 168 DOTP Plasticizer |
| 0.9 wt % | Azodicarbonamide CBA (4 µm particle size) |
| 0.7 wt % | 14% Zinc Octoate mixture |
| 12 wt % | Solvay 370HD PVC resin |
| 18 wt % | Policyd Vinycel 124 |
| 15 wt % | Calcium carbonate |
| 2 wt % | Sovereign U005-190D |
| 5 wt % | Pigment |
| 2 wt % | Bio-batch additive |

The numbers in this example represent weight percentage. Bench testing was conducted where the dip and scrape manufacturing method discussed herein was simulated by dipping a knit polyester scrim into the biodegradable composition, scraping the excess biodegradable composition off the coated scrim, and then curing the coated scrim in an oven at 200 degrees Celsius for 2 minutes. The biodegradable composition coated onto the textile substrate produced an acceptable coated textile product.

While various embodiments of the composition, coated fabrics and methods have been shown and described, various modifications and substitutions may be made thereto without departing from the spirit and scope of the disclosure. Those skilled in the art will readily see other embodiments within the scope of the disclosure. Accordingly, it is to be understood that the various embodiments of the composition, coated fabrics and methods have been described by way of illustration only and not by way of limitation.

What is claimed is:

1. A composition comprising:
a polyvinylchloride homopolymer;
a biodegradable plasticizer;
a swelling agent
wherein the polyvinylchloride homopolymer is a polymer backbone chain; and
further comprising a blowing agent and a carbohydrate coupled off the polyvinylchloride homopolymer backbone chain; wherein said blowing agent comprises a chemical blowing agent, expandable microspheres, or combinations therefore; and wherein said plasticizer is between about 30-60 pbw, said carbohydrate is between about 1-20 pbw, said swelling agent is between about 1-20 pbw, said expandable microspheres are between about 1-20 pbw, and said chemical blowing agent is between about 0-10 pbw, in which pbw is parts by weight per 100 parts polyvinylchloride homopolymer.

2. A composition comprising:
a polyvinylchloride homopolymer;
a biodegradable plasticizer;
a carbohydrate coupled to said polyvinylchloride homopolymer;
wherein the polyvinylchloride homopolymer is a polymer backbone chain; and
further comprising azodicarbonamide and expandable microspheres; wherein said plasticizer is between about 30-60 pbw, said carbohydrate is between about 1-20 pbw, said expandable microspheres are between about 1-20 pbw, and said azodicarbonamide is between about 0-10 pbw, in which pbw is parts by weight per 100 parts polyvinylchloride homopolymer.

* * * * *